(12) United States Patent
Iwachido (10) Patent No.: US 11,067,019 B2
(45) Date of Patent: Jul. 20, 2021

(54) EXHAUST CONTROLLING APPARATUS FOR INTERNAL COMBUSTION ENGINE

(71) Applicant: MITSUBISHI JIDOSHA KOGYO KABUSHIKI KAISHA, Tokyo (JP)

(72) Inventor: Kinichi Iwachido, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 16/562,728

(22) Filed: Sep. 6, 2019

(65) Prior Publication Data

US 2020/0088118 A1    Mar. 19, 2020

(30) Foreign Application Priority Data

Sep. 18, 2018    (JP) .............................. JP2018-173294

(51) Int. Cl.
*F02D 41/02* (2006.01)
*F02D 41/14* (2006.01)
(Continued)

(52) U.S. Cl.
CPC ........... *F02D 41/029* (2013.01); *F01N 3/023* (2013.01); *F01N 3/101* (2013.01); *F01N 9/002* (2013.01);
(Continued)

(58) Field of Classification Search
CPC ....... F01N 3/023–0296; F01N 2430/08; F02D 41/029; F02D 41/1475; F02D 41/047; F02D 41/40–405
(Continued)

(56) References Cited

U.S. PATENT DOCUMENTS 6,679,050 B1    1/2004   Takahashi et al.
2011/0036144 A1    2/2011   Weiss et al.
(Continued)

FOREIGN PATENT DOCUMENTS

DE    10 2013 220 899 A1    4/2015
DE    10 2016 110 632 A1    12/2017
(Continued)

OTHER PUBLICATIONS

Extended European Search Report dated Apr. 6, 2020 issued in corresponding European Patent Application No. 19 193 964.4.
(Continued)

*Primary Examiner* — Mark A Laurenzi
*Assistant Examiner* — Mickey H France
(74) *Attorney, Agent, or Firm* — Birch, Stewart, Kolasch & Birch, LLP (57) ABSTRACT

A filter is disposed on an exhaust path of the internal combustion engine to capture particulate matter exhausted from the internal combustion engine. A controller is caused to execute regeneration control that incinerates the particulate matter captured on the filter. The controller accomplishes the regeneration control by executing lean incineration control and stoichiometric incineration control in combination with each other. The lean incineration control incinerates the particulate matter, keeping an air-fuel ratio of the internal combustion engine to be leaner than a logical air-fuel ratio. The stoichiometric incineration control incinerates the particulate matter, oscillating the air-fuel ratio of the internal combustion engine about the logical air-fuel ratio as an average air-fuel ratio at a predetermined first cycle.

8 Claims, 6 Drawing Sheets

(51) Int. Cl.
  *F02P 5/04* (2006.01)
  *F01N 3/10* (2006.01)
  *F01N 9/00* (2006.01)
  *F02P 5/15* (2006.01)
  *F01N 3/023* (2006.01)

(52) U.S. Cl.
  CPC ....... *F02D 41/025* (2013.01); *F02D 41/1454* (2013.01); *F02D 41/1475* (2013.01); *F02P 5/045* (2013.01); *F02P 5/1502* (2013.01); *F01N 2430/06* (2013.01); *F01N 2430/08* (2013.01); *F01N 2560/026* (2013.01); *F01N 2560/05* (2013.01); *F01N 2560/06* (2013.01); *F01N 2560/08* (2013.01); *F01N 2900/1402* (2013.01); *F01N 2900/1602* (2013.01); *F01N 2900/1606* (2013.01); *F02D 2200/0812* (2013.01); *Y02T 10/12* (2013.01); *Y02T 10/40* (2013.01)

(58) Field of Classification Search
  USPC .......... 60/311, 273, 274, 284–287, 291, 295, 60/297, 320
  See application file for complete search history.

(56) References Cited

U.S. PATENT DOCUMENTS

| 2011/0073088 A1 | 3/2011 | Hubbard et al. |
| 2014/0041362 A1 | 2/2014 | Ulrey et al. |
| 2018/0202336 A1 | 7/2018 | Kaneko et al. |
| 2019/0032585 A1* | 1/2019 | Kelly .................... F02B 39/10 |

FOREIGN PATENT DOCUMENTS

| DE | 10 2017 100 892 A1 | 7/2018 |
| EP | 2 511 491 A1 | 10/2012 |
| JP | 2000-265885 A | 9/2000 |
| JP | 2012-241528 A | 9/2000 |
| JP | 2009-156106 A | 7/2009 |

OTHER PUBLICATIONS

Partial European Search Report dated Feb. 7, 2020 issued in corresponding EP Patent Application No. 19 193 964.4.

Chinese Office Action and Search Report for Chinese Application No. 201910881673.5, dated Mar. 25, 2021, with English translation.

\* cited by examiner

Normal control

FIG.4B

Stoichiometric heating control

FIG.4C

Lean incineration control

FIG.4D

Stoichiometric incineration control

EXHAUST CONTROLLING APPARATUS FOR INTERNAL COMBUSTION ENGINE

CROSS-REFERENCE TO THE RELATED APPLICATION

This application incorporates by references the subject matter of Japanese Patent Application No. 2018-173294 filed in Japan on Sep. 18, 2018 on which a priority claim is based under 35 U.S.C. § 119(a).

FIELD

The present invention relates to an exhaust controlling apparatus that purifies an exhaust gas from an internal combustion engine.

BACKGROUND

An exhaust purifying system for purifying an exhaust gas has been traditionally known which interposes a particulate filter (hereinafter, referred to as a filter) in an exhaust path of an engine (internal composition engine) and purifies the exhaust gas with the filter. Specifically, such PM is captured by the filter and removed by being burnt on the filter. A filter for a diesel engine is called a Diesel Particulate Filter (DPF) and a filter for a gasoline engine is called a Gasoline Particulate Filter (GPF).

Soot (carbon), which is the principal component of the PM, spontaneously burns (oxidizes) in vicinity of the catalyst supported on the surface of the filter if oxidizing atmosphere of sufficiently high temperature is formed. Accordingly, under a state of a high engine speed that causes the exhaust temperature of the engine to be high, the PM is spontaneously incinerated. In contrast, under a state of a low engine speed, the exhaust temperature does not easily rise, so that a stacking amount of PM increases and the filter may easily clog. As a solution to the above, control to burn the PM by positively raising the exhaust temperature, depending on a stacking amount of PM and/or the degree of clogging. This control affects the filter to regain its filtering function and therefore is called regeneration control, forcible regeneration control, or active control.

One of the techniques related to the regeneration control of a filter improves the exhaust gas property by oscillating the air-fuel ratio between a richer value than a stoichiometric air-fuel ratio (stoichiometric value) and a leaner value than the stoichiometric air-fuel ratio. For example, control is proposed which has the same fluctuating widths to the rich side and the lean side, regarding the stoichiometric air-fuel ratio as the oscillation center of the air-fuel ratio (see Japanese Patent Laid-Open Publication No. 2009-156106). Setting the average of the air-fuel ratio to a value close to the stoichiometric air-fuel ratio makes it possible to let the PM captured on the filter burn, keeping the purification ability of the catalyst. Also for an exhaust purifying system including a catalyst device (e.g., a three-way catalyst) except for a filter, a technique is proposed which improves the exhaust gas property by oscillating the air-fuel ratio (see Japanese Patent Laid-Open Publication No. 2000-265885, and Japanese Patent Laid-Open Publication No. 2012-241528).

It is preferable that an adequate amount of oxygen exists in the vicinity of the PM captured on the filter in order to let the PM burn. In relation to this point, oscillating the air-fuel ratio between the rich side and the lean side can raise the oxygen concentration in the exhaust gas at least during the lean period, and an amount of oxygen is apparently reserved.

However, the oxygen concentration in the exhaust gas in the rich period is lowered as compared with a case where the stoichiometric air-fuel ratio is kept. Consequently, the total amount of oxygen would easily lack, sometimes leading to lowering the regeneration efficiency of the filter and the property the exhaust gas property due to delaying of the timing of the start of burning PM and lowering of the burning velocity.

SUMMARY

Technical Problems

With the foregoing problems in view, one of the objects of the present invention is to provide an exhaust controlling apparatus for an internal combustion engine that can enhance both the regeneration efficiency of the filter and the exhaust gas property.

Solution to Problems

An exhaust controlling apparatus for an internal combustion engine disclosed herein includes: a filter that is disposed on an exhaust path of the internal combustion engine and that captures particulate matter exhausted from the internal combustion engine; and a controller that executes regeneration control that incinerates the particulate matter captured on the filter. The controller is executing the regeneration control, the controller executes lean incineration control and stoichiometric incineration control in combination with each other. The lean incineration control incinerates the particulate matter, keeping an air-fuel ratio of the internal combustion engine to be leaner than a logical air-fuel ratio. The stoichiometric incineration control incinerates the particulate matter, oscillating the air-fuel ratio of the internal combustion engine about the logical air-fuel ratio as an average air-fuel ratio at a predetermined first cycle.

Advantageous Effects

Lean incineration control can increase the oxygen concentration in the exhaust gas to be introduced into the filter, so that the efficiency of incinerating particulate matter can be enhanced. In contrast, stoichiometric incineration control can suppress the generation of nitrogen oxide (NOx), ensuring the certain oxygen concentration to let the PM burn. Combining the above controls makes it possible to enhance both the regeneration efficiency of the filter and the property of the exhaust gas.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Figure 1:
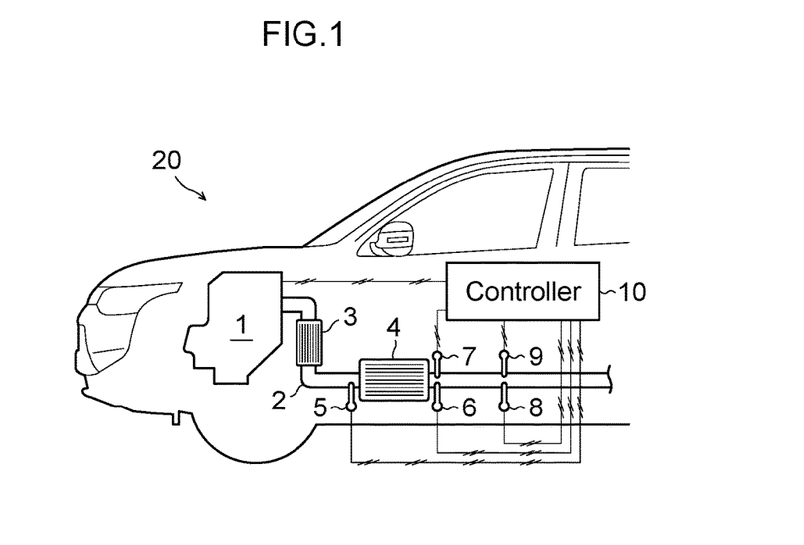
FIG. 1 is a diagram illustrating a configuration of an exhaust controller for an internal combustion engine.

1. Device Configuration:

Hereinafter, description will now be made in relation to an exhaust controlling apparatus for an internal combustion engine according to an embodiment with reference to the accompanying drawings. As illustrated in FIG. 1, the exhaust controlling apparatus of the present embodiment is applied to a vehicle 20 equipped with an engine 1 (internal combustion engine). The type of the engine 1 may be a diesel engine or a gasoline engine. The engine 1 is provided with various sensors (e.g., an engine speed sensor, a torque sensor, an acceleration opening sensor, a throttle opening sensor, an intake air pressure sensor, and an intake air flow amount sensor that are however not illustrated) to obtain various data related to the running state thereof. In an exhaust path 2 of the engine 1, at least a filter 4 is interposed, and an oxidizing catalyst 3 is preferably interposed. In the example of FIG. 1, the filter 4 is arranged downstream of the oxidizing catalyst 3, but the positions and the sequence of arrangement of the oxidizing catalyst 3 and the filter 4 can be modified.

The oxidizing catalyst 3 is a catalytic device for efficiently purifying various toxic components contained in the exhaust gas, and has at least oxidizability. Specifically, the oxidizing catalyst 3 has a function for oxidizing toxic components such as unburned fuel (HC, hydrocarbon) and carbon monoxide (CO) contained in the exhaust gas, and acts on the exhaust gas so as to increase the temperature of the exhaust gas by the heat of reaction. The oxidizing catalyst 3 of the present embodiment is a Three-Way Catalyst (TWC), which has an additional function for reducing nitrogen oxide (NOx) contained in the exhaust gas. The oxidizing catalyst 3 is preferably arranged at a position where high-temperature exhaust gas passes from a viewpoint of ensuring the catalytic reactivity. For example, as shown in FIG. 1, the oxidizing catalyst 3 may preferably be arranged at a position (e.g., immediately downstream of the exhaust manifold or immediately downstream of the supercharger) close to the exhaust manifold of the engine 1.

A filter 4 is a filtering device that captures particulate matter (PM) exhausted from the engine 1. The principal component of PM is soot (carbon) and formed of unburned fuel components, lubricant oil components, and sulfate components adhering to the surface of soot aggregated into particulate. The PM exhausted from the engine 1 has a dimension of several micrometers or less (one micrometer is $10^{-6}$ [m]) and a large number of pores having diameters consistent with the dimension of the PM are formed on the filter 4. On the surface of the filter 4, a catalyst is supported to let the PM burn. The stacking amount of PM captured on the filter 4 and the degree of clogging the filter 4 by the captured PM are managed by a controller 10.

On the exhaust path 2, an upstream pressure sensor 5 is arranged on the upstream side of the filter 4 and a downstream pressure sensor 6 is arranged on the downstream side of the filter 4. These sensors 5 and 6 are each pressure sensor that detects the pressure of the exhaust gas. The upstream pressure sensor 5 detects an upstream pressure $P_1$ and the downstream pressure sensor 6 detects a downstream pressure $P_2$. In general, as the stacking amount of PM captured on the filter 4 increases, the upstream pressure $P_1$ rises and the downstream pressure $P_2$ lowers. Accordingly, the stacking amount of PM captured by the filter 4 and the degree of clogging the filter 4 can be estimated by referring to the data of these pressures. In the present embodiment, the stacking amount of PM is estimated on the basis of the difference between the upstream pressure $P_1$ and the downstream pressure $P_2$.

At the downstream side of the filter 4, a temperature sensor 7, a NOx sensor 8, and a PM sensor 9 are arranged. The temperature sensor 7 is a thermosensor that detects the temperature (exhaust temperature) of the exhaust gas. Likewise, the NOx sensor 8 detects the concentration of nitrogen oxide (NOx concentration) contained in the exhaust gas, and the PM sensor 9 detects the concentration of PM (PM concentration) contained in the exhaust gas. However, the NOx sensor 8 and the PM sensor 9 can be omitted. The information of the exhaust temperature is used for estimating the filter temperature. The information of the NOx concentration is used for grasping an amount of nitrogen oxide passing through the oxidizing catalyst 3 and the filter 4. The PM concentration increases as a PM amount that has not been captured by the filter 4 but has passed through the filter 4 increase, and can be used for estimating the stacking amount of PM.

Figure 2:
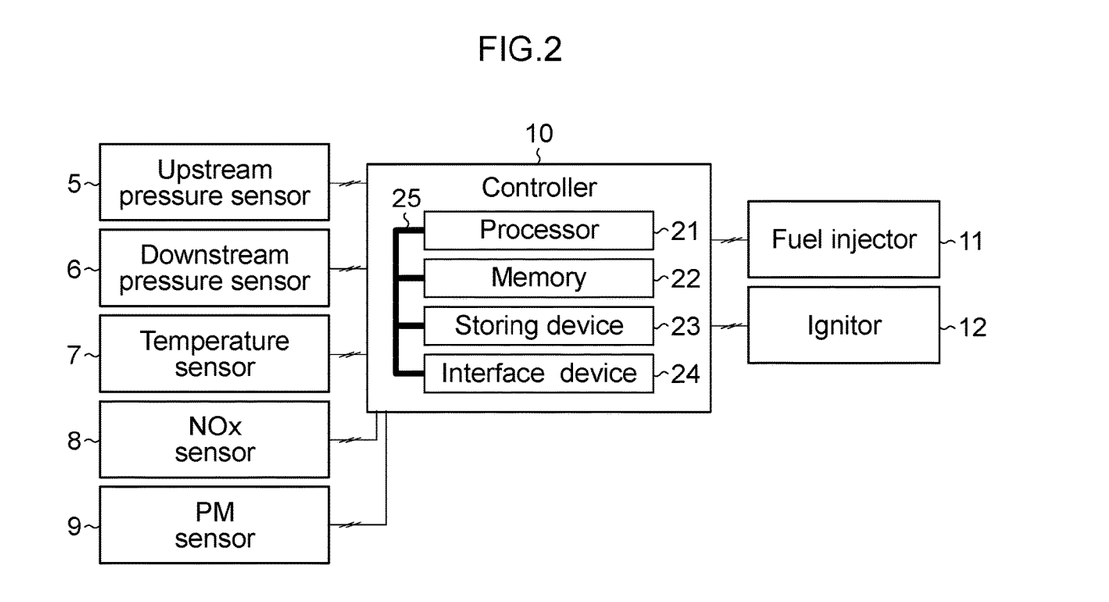
FIG. 2 is a diagram illustrating the hardware configuration of a controller that controls the air-fuel ratio and the ignition timing.

The data detected by the above sensors 5-9 are transmitted to the controller 10. The controller 10 is an electronic control unit (computer) that controls the running state of the engine 1, and specifically carries out control that enhances a filtering state of the filter 4 and an exhaust gas property. To the controller 10, various publicly known hardware configurations can be applied. For example, as shown in FIG. 2, the controller 10 includes a processor 21 (Central Processing Unit), a memory 22 (main memory), a storing device 23 (storage), and an interface device 24, which are coupled to one another via an internal bus 25. A publicly known ECU such as a vehicle ECU or an engine ECU may function as the controller 10.

The controller 10 of the present embodiment controls a fuel injection valve 11 (injector) and an ignition device 12 (ignitor) on the basis of data detected by the sensors 5-9. The air-fuel ratio of the fuel-mixed air provided to the engine 1 can be varied by changing an amount of fuel to be injected from the fuel injection valve 11 and/or the injection timing of the fuel injection valve 11. Likewise, the ignition timing (i.e., the timing of ignition in the combustion cycle) can be varied by adjusting the spark timing of the ignitor 12.

2. Control Configuration:

The controller 10 carries out the four types of control of normal control, stoichiometric heating control, lean incineration control, and stoichiometric incineration control. The three controls except for the normal control are included in the regeneration control that incinerates the PM captured on the filter 4. While any of the regeneration control is not being carried out, the normal control is carried out. The regeneration control is started if the running state of the engine 1 is suitable for regenerating the filter 4 and a condition for starting regeneration of the filter 4 is satisfied. The former condition can be checked on the basis of any one of the following conditions 1-3. Likewise, the latter condition can be checked on the basis of any one of the following conditions 4-6.

Condition 1: the engine speed is a predetermined value or less.

Condition 2: the degree of the throttle opening is a predetermined degree of opening or less.

Condition 3: the temperature of the engine coolant is a predetermined temperature of more.

Condition 4: the stacking amount of PM is a predetermined amount or more.

Condition 5: The difference pressure between the upstream pressure $P_1$ and the downstream pressure $P_2$ is a predetermined value or more.

Condition 6: The PM concentration at the downstream point of the filter 4 is the predetermined concentration or more.

Figure 3A:
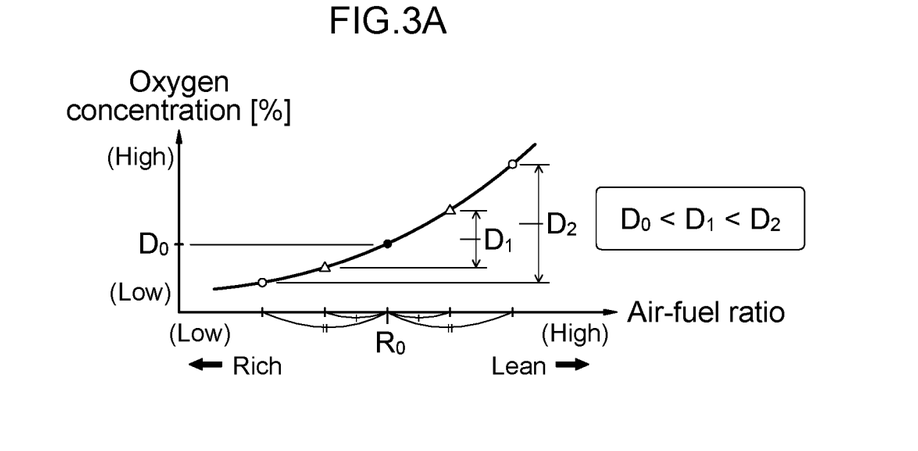
FIG. 3A is a graph showing a relationship between the air-fuel ratio and the oxygen concentration (O2) and FIG. 3B is a graph showing a relationship between the air-fuel ratio and the carbon monoxide concentration (CO)

The normal control, the stoichiometric heating control, and the stoichiometric incineration control each carry out control that oscillates the air-fuel ratio of the engine 1, regarding the logical air-fuel ratio $R_0$ as the average air-fuel ratio. Here, description will now be made in relation to meaning of oscillating the air-fuel ratio around the logical air-fuel ratio $R_0$. Around the logical air-fuel ratio $R_0$, the oxygen concentration of the exhaust gas increases as the air-fuel ratio increases (become leaner). At that time, the inclination of increasing the oxygen concentration to the air-fuel ratio is not constant, but increases as the air-fuel ratio is larger. For the above, as illustrated in FIG. 3A, the average oxygen concentration $D_1$ when the air-fuel ratio is oscillated toward the rich side and the lean side about the logical air-fuel ratio $R_0$ becomes larger than the average oxygen concentration Do under a state of maintaining the logical air-fuel ratio $R_0$. The symbol $D_2$ represents an average oxygen concentration when the amplitude of the air-fuel ratio is increased. As described above, as the amplitude of the air-fuel ratio is increased, the average value of the oxygen concentration in the exhaust path 2 increases, so that the total amount of oxygen can be easily reserved for the oxidizing catalyst 3 and filter 4.

Figure 3B:
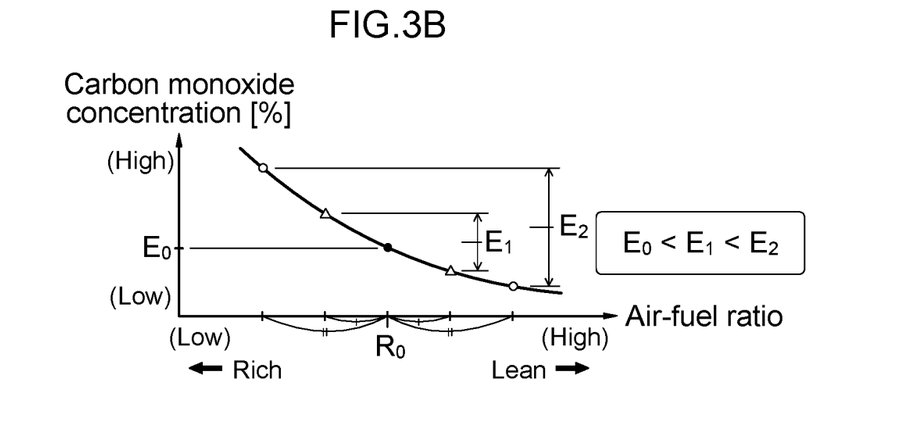

Likewise, around the logical air-fuel ratio $R_0$, the carbon monoxide concentration of the exhaust gas decreases as the air-fuel ratio increases (become leaner). At that time, the inclination of decreasing the carbon monoxide concentration to the air-fuel ratio is not constant, but decreases as the air-fuel ratio is larger. For the above, as illustrated in FIG. 3B, the average carbon monoxide concentration $E_1$ when the air-fuel ratio is oscillated toward the rich side and the lean side about the logical air-fuel ratio $R_0$ becomes larger than the average carbon monoxide concentration $E_0$ under a state of maintaining the logical air-fuel ratio $R_0$. The symbol $E_2$ represents an average carbon monoxide concentration when the amplitude of the air-fuel ratio is increased. As described above, as the amplitude of the air-fuel ratio is increased, the average value of the carbon monoxide concentration in the exhaust path 2 increases, so that oxidization of carbon monoxide is enhanced and also the filter temperature rises.

Next, description will now be made in relation to respective characteristics of the four controls performed by the controller 10.

Figure 4A:
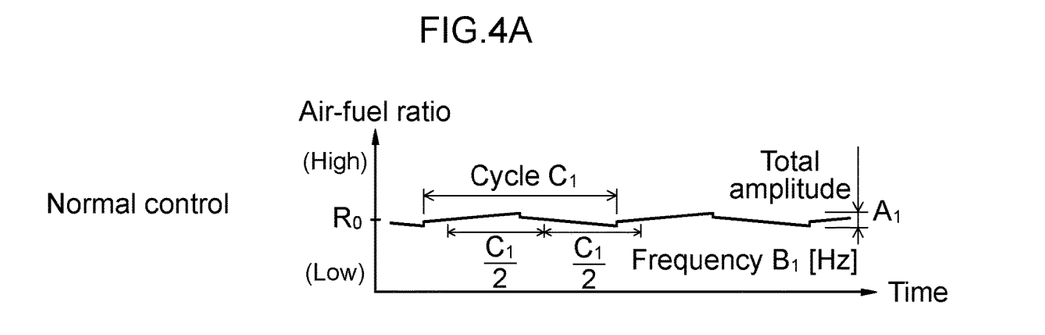
FIGS. 4A-4D are graphs illustrating fluctuations pattern of the air-fuel ratio, FIG. 4A being related to normal control, FIG. 4B being related to stoichiometric heating control, FIG. 4C being related to lean incineration control, FIG. 4D being related to a stoichiometric incineration control.

As illustrated in FIG. 4A, the normal control controls the air-fuel ratio (target air-fuel ratio) of the engine 1 to oscillate relatively narrowly about the logical air-fuel ratio $R_0$. The oscillation of the air-fuel ratio has the same amplitude on the rich side and the lean side, and has a peak-to-peak amplitude $A_1$ of about 0.4 (i.e., oscillation of the air-fuel ratio of $R_0 \pm 0.2$). The frequency $B_1$ of the oscillation of the air-fuel ratio is set to about 1 Hz. A time period when the air-fuel ratio in this oscillation of the air-fuel ratio is rich is the same as that when the air-fuel ratio is lean and is set to be the half the cycle $C_1$. Hereinafter, the cycle of the oscillation of the air-fuel ratio in the normal control is also referred to as a reference cycle $C_1$.

The stoichiometric heating control is control that is performed when the filter temperature is considered to be slightly insufficient for a burning reaction of PM, and is carried out mainly for raising the temperature of the filter 4. The stoichiometric heating control is continued until the filter temperature reaches a predetermined temperature. Here, the predetermined temperature is temperature at which the burning reaction of PM preferably proceeds and specifically is 600-650° C. After the filter temperature reaches the predetermined temperature, either one of the lean incineration control and the stoichiometric incineration control is carried out. In this connection, the filter temperature lowers below the predetermined temperature during the lean incineration control or the stoichiometric incineration control under arctic environment, for example, the stoichiometric heating control may be carried out again.

Figure 4B:
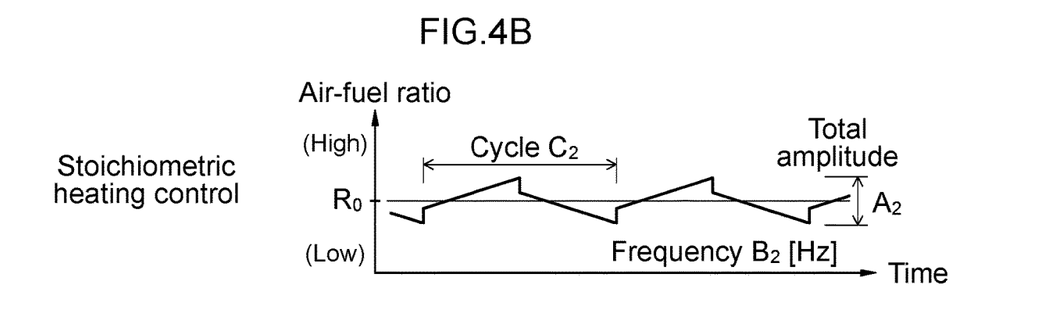

As shown in FIG. 4B, the stoichiometric heating control controls the air-fuel ratio (target air-fuel ratio) of the engine 1 to oscillate about the logical air-fuel ratio $R_0$. The amplitude of the air-fuel ratio is set to be larger at least than that of the normal control and is preferably set to be about 1.5 to 3 times the amplitude of the normal control. For example, assuming that the peak-to-peak amplitude $A_1$ of the normal control is about 0.4, the peak-to-peak amplitude $A_2$ of the stoichiometric heating control is about 0.8 (i.e., oscillation of the air-fuel ratio of $R_0 \pm 0.4$). The frequency $B_2$ of the oscillation of the air-fuel ratio is set to be the same as or to be slightly larger than that of the normal control (e.g., about 1-2 Hz). This means that the cycle (second cycle $C_2$) of the oscillation of the air-fuel ratio in the stoichiometric heating control is set to be equal to or smaller than the reference cycle $C_1$.

Here, during the stoichiometric heating control, retardation control is executed which shifts the ignition timing of the engine 1 to the retarding direction as compared with that of the normal control. Retarding the ignition timing during the stoichiometric heating control raises the exhaust temperature, so that the filter temperature rapidly rises. The ignition timing of the retardation control may be a fixed predetermined timing or may be a variable timing calculated on the basis of the running state (e.g., the engine speed or the engine load) of the engine 1.

The lean incineration control and the stoichiometric incineration control each aim at incinerating PM. The lean incineration control is preferably applied when the burning velocity or oxidization reactivity of PM need to be enhanced. In contrast, the stoichiometric incineration control is preferably applied when an amount of NOx to be exhausted from the engine 1 need to be decreased, maintaining the oxidization of PM. The present embodiment enhances both the regeneration efficiency of the filter 4 and the exhaust gas property by the combination of these controls.

Figure 4C:
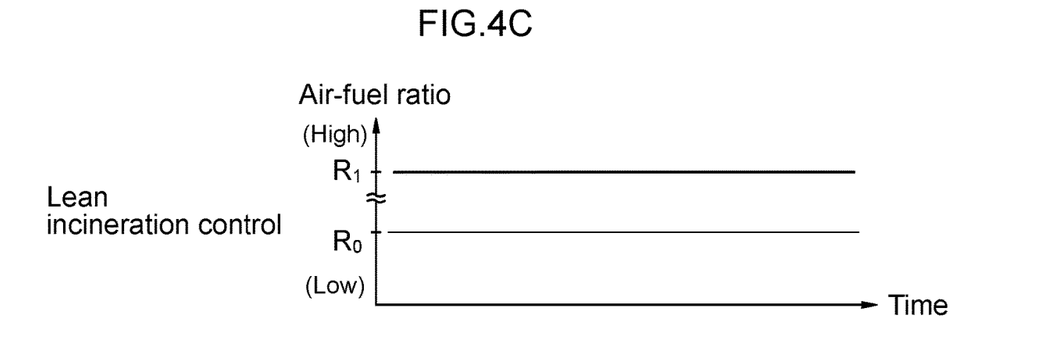
Figure 5:
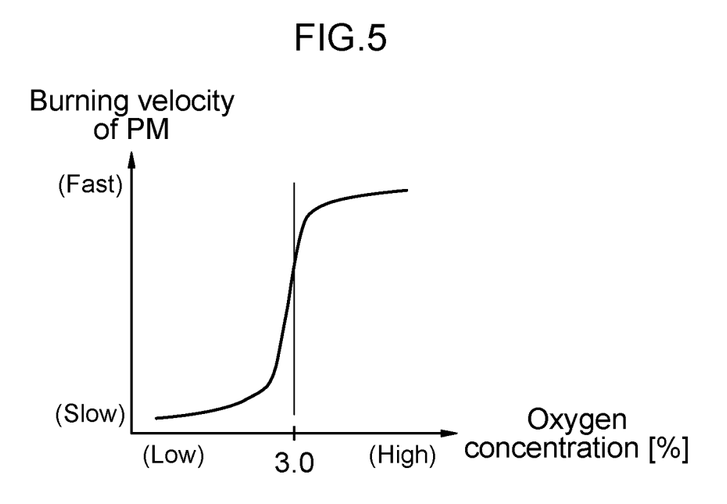
FIG. 5 is a diagram showing a velocity of regenerating the filter, specifically showing a relationship between the oxygen concentration around the filter and a decreasing rate of particulate matter captured by the filter.

As illustrated in FIG. 4C, the lean incineration control maintains the air-fuel ratio (target air-fuel ratio) of the engine 1 to a predetermined air-fuel ratio $R_1$ leaner than the logical air-fuel ratio $R_0$. The value of the predetermined air-fuel ratio $R_1$ is larger at least than the logical air-fuel ratio $R_0$, and is preferably a value that ensures the oxygen concentration at which a desired burning velocity can be obtained. Here, as shown in FIG. 5, the burning velocity of PM sharply declines when the oxygen concentration lowers below about 3.0%. From this viewpoint, an air-fuel ratio (about 16-18) that ensures the oxygen concentration of about 3.0% is preferably set to the predetermined air-fuel ratio $R_1$.

During the lean incineration control, an advance control is executed which shifts the ignition timing of the engine 1 to the advancing direction as compared with that of the normal control. Advancing the ignition timing during lean incineration control lowers the exhaust temperature, so that the filter temperature can be prevented from overrising. The ignition timing of the advance control may be a fixed predetermined timing or may be a variable timing calculated on the basis of the running state (e.g., the engine speed or the engine load) of the engine 1.

Figure 4D:
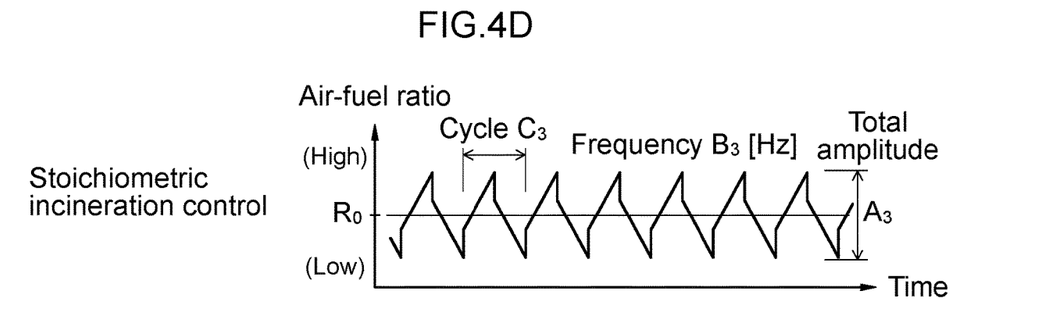

Like the stoichiometric heating control, the stoichiometric incineration control controls the air-fuel ratio (target air-fuel ratio) of the engine 1 to oscillate about the logical air-fuel ratio $R_0$. As shown in FIG. 4D, the stoichiometric incineration control sets the amplitude of the oscillation of the air-fuel ratio to be larger at least than that of the stoichiometric heating control, preferably 1.5 to 3.0 times the amplitude of the stoichiometric heating control. For example, assuming that the peak-to-peak amplitude $A_2$ of the stoichiometric heating control is 0.8, the peak-to-peak amplitude $A_3$ of the stoichiometric incineration control is set to be about 1.2 (i.e., oscillation of the air-fuel ratio of $R_0 \pm 0.6$). The frequency $B_3$ of the oscillation of the air-fuel ratio is set to be the same as or to be slightly larger than that of the stoichiometric heating control (e.g., about 5 Hz). This means that the cycle (first cycle $C_3$) of the oscillation of the air-fuel ratio in the stoichiometric incineration control is set to be equal or smaller than the reference cycle $C_1$ and also equal to or smaller than the second cycle $C_2$.

During the stoichiometric incineration control, ignition timing variable control is executed which changes the ignition timing, depending on the filter temperature. In this example, the ignition timing is set to be more advanced as the filter temperature is higher, and conversely to be more retarded as the filter temperature is lower. In the present embodiment, the ignition timing during the stoichiometric incineration control is set on the basis of the running state (e.g., the engine speed or the engine load) of the engine 1 and the filter temperature. This setting makes it easy to keep the filter temperature at a predetermined temperature, so that the burning reaction of the PM can be stabilized.

The lean incineration control and the stoichiometric incineration control are switched to each other, depending on the stacking amount of PM captured by the filter 4 or the concentration of NOx exhausted from the engine 1. For example, on the premise that the NOx concentration is a desired predetermined concentration or less, the lean incineration control is executed in cases where the stacking amount of PM is a predetermined amount or more. In contrast to the above, in cases where the NOx concentration is higher than the predetermined concentration or the stacking amount of Pm is less than the predetermined amount, the stoichiometric incineration control is executed until a regeneration finishing condition is satisfied. The regeneration finishing condition is checked on the basis of the following conditions 7-9.

Condition 7: the stacking amount of PM is a second predetermined amount or less.

Condition 8: the pressure difference between the upstream pressure $P_1$ and the downstream pressure $P_2$ is a second predetermined value or less.

Condition 9: the PM concentration at the downstream of the filter 4 is a second predetermined concentration or less.

The lean incineration control and the stoichiometric incineration control may be switched by referring to either one of the stacking amount of PM and the NOx concentration or may be alternately carried out. The number of times of executing the lean incineration control and the stoichiometric incineration control and the sequence of executing the lean incineration control and the stoichiometric incineration control are not fixed. Alternatively, in switching between the lean incineration control and the stoichiometric incineration control, either one of the stacking amount of PM and the NOx concentration may be referred on the basis of the frequency of executing the regeneration control.

For example, while the stacking amount of PM is the predetermined amount or more, the lean incineration control is executed, and when the stacking amount of PM comes to be less than the predetermined amount, the stoichiometric incineration control is executed. Otherwise, while the NOx concentration is less than the predetermined concentration, the lean incineration control is executed, and when the NOx concentration comes to be the predetermined concentration or more, the stoichiometric incineration control is executed. After that, the NOx concentration comes to be less than the predetermined concentration, the lean incineration control is resumed. As described above, the lean incineration control is advantageous to rapidly burning the PM and the stoichiometric incineration control is advantageous to reducing the NOx amount to be exhausted from the engine 1. By properly using each of these controls in accordance with the circumstance, the regeneration efficiency of the filter 4 and the exhaust gas property can be both enhanced.

The characteristics of the above four controls are collectively shown as follows.

TABLE 1

| | A/F | | | | |
|---|---|---|---|---|---|
| | Avg. | Oscillation | Amplitude | Cycle | Ignition timing |
| Normal control | Stoichiometric | Yes | Small | Long | Normal |
| Stoichiometric heating control | Stoichiometric | Yes | Middle | Long to middle | Retarded |
| Lean incineration control | Lean | No | — | — | Advanced |
| Stoichiometric incineration control | Stoichiometric | Yes | Large | Long to small | Variable |

3. Flow Diagram

Figure 6:
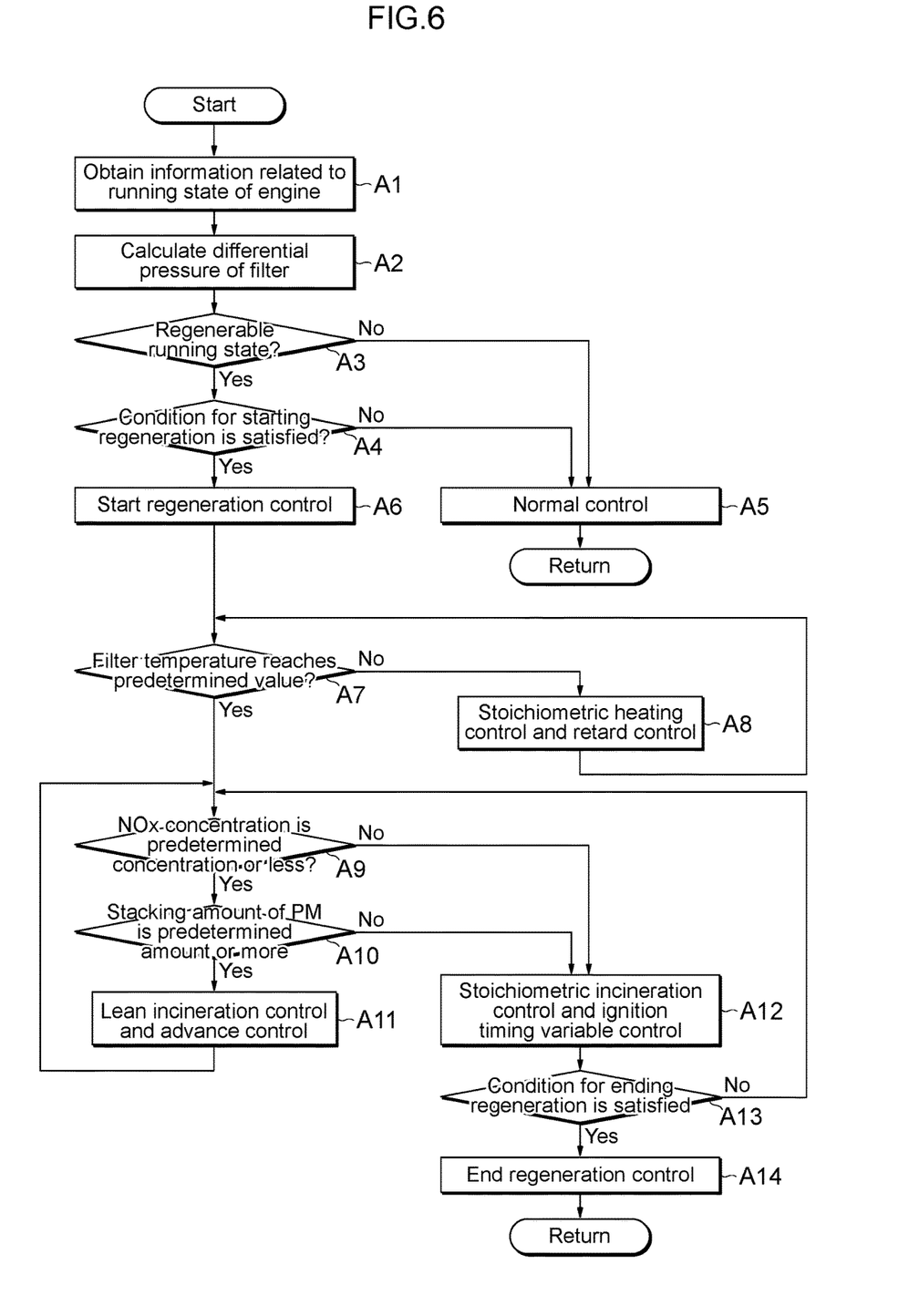
FIG. 6 is a diagram illustrating a succession of procedural steps for regeneration control.

FIG. 6 is a flow diagram showing a procedure of regeneration control performed in the controller 10, and FIG. 7 are graphs representing controlling effects of the regeneration control. The flow of FIG. 6 is repeatedly carried out at regular intervals while the engine 1 is running. To begin with, the information (e.g., the engine speed or the degree of the throttle opening) related to the running state of the engine 1 is obtained (Step A1). In addition, on the basis of the upstream pressure $P_1$ and the downstream pressure $P_2$ detected by the upstream pressure sensor 5 and the downstream pressure sensor 6, respectively, the pressure difference between the upstream pressure $P_1$ and the downstream pressure $P_2$ is calculated (Step A2).

In succession, determination is made as to whether or not the running state of the engine 1 is in a state where the regeneration control on the filter 4 can be performed (Step A3). In this step, determination is made as to whether at least one of Conditions 1-3 is satisfied (preferably all the three conditions are satisfied). If the condition of Step A3 is satisfied, further determination is made as to whether the condition for starting regeneration of the filter 4 is satisfied (Step A4). In this step, determination is made as to whether at least one of Conditions 4-6 is satisfied.

Figure 7A:
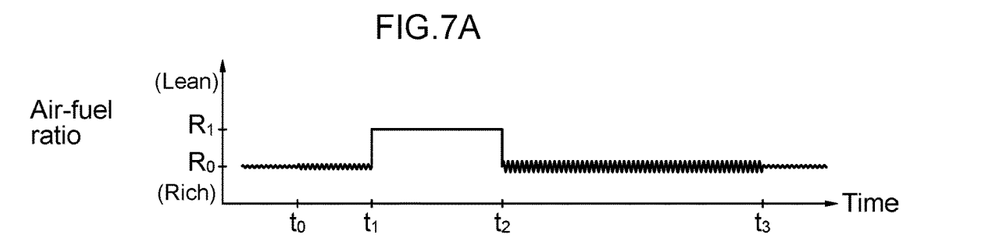
FIGS. 7A-7F are graphs representing chronological changes in the regeneration control, FIG. 7A being related to an air-fuel ratio, FIG. 7B being related to an ignition timing, FIG. 7C being related to types of control on air-fuel ratio, FIG. 7D being related to a nitrogen oxide (NOx) concentration, FIG. 7E being related to a stacking amount of particulate matter (PM), and FIG. 7F being related to a filter temperature.
Figure 7B:
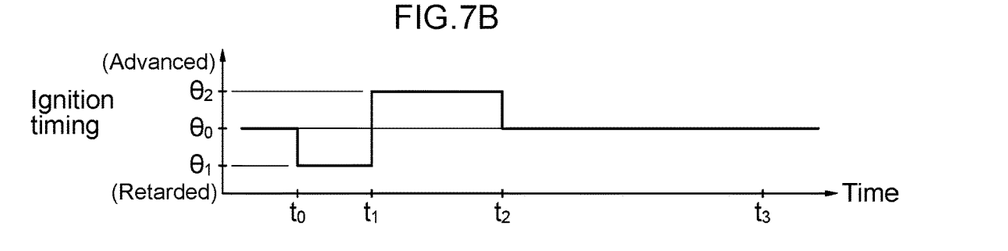
Figure 7C:
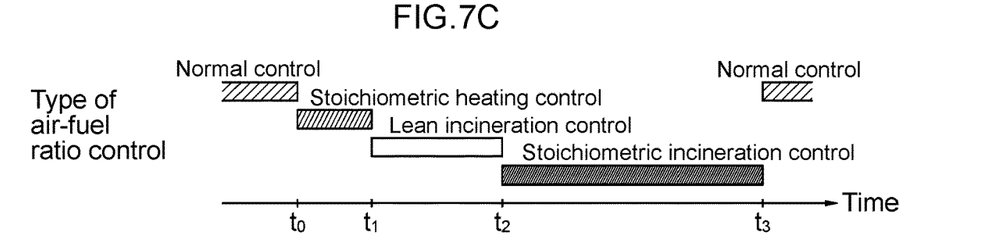
Figure 7D:
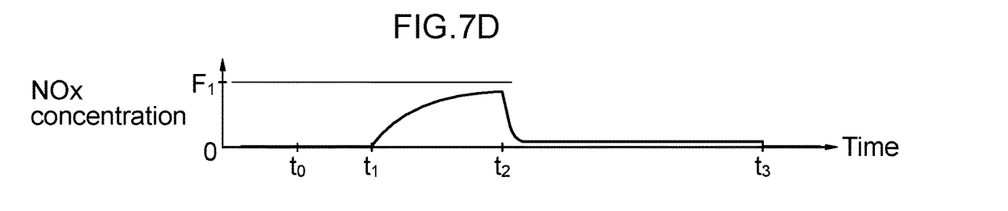
Figure 7E:
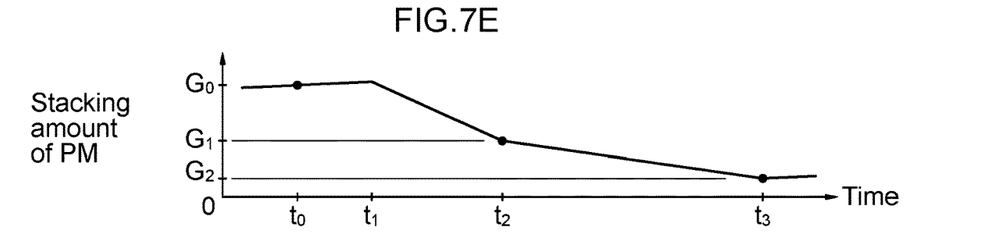

If at least one of the conditions of Steps A3 and A4 is not satisfied, the normal control is executed (Step A5). If the both conditions of Steps A3 and A4 are satisfied, the regeneration control on the filter 4 is started (Step A6), and the process of Step A7 and the steps subsequent to Step A7 is executed. For example, as shown in FIG. 7E, the regeneration control is started at the time t0 at which the stacking amount of PM comes to be the predetermined amount G0 or more.

Here, the filter temperature is estimated on the basis of the exhaust temperature detected by the temperature sensor 7, and determination is made as to whether the filter temperature reaches the predetermined temperature (Step A7). If this condition is satisfied, burning reaction of PM on the surface of the filter 4 is determined to be expected and the procedure proceeds to a flow (Step A9) to execute the lean incineration control and the stoichiometric incineration control.

In contrast, if the filter temperature does not reach the predetermined temperature, the fuel injection valve 11 of the engine 1 is controlled in the stoichiometric heating control and also the ignitor 12 is controlled in the retardation control. For example, as shown by time period between times t0 and t1 in FIGS. 7A and 7B, the air-fuel ratio is controlled so as to oscillate about the logical air-fuel ratio $R_0$ and the ignition timing is changed to a first ignition timing $\theta_1$ retarded from the normal ignition timing $\theta_0$.

Figure 7F:
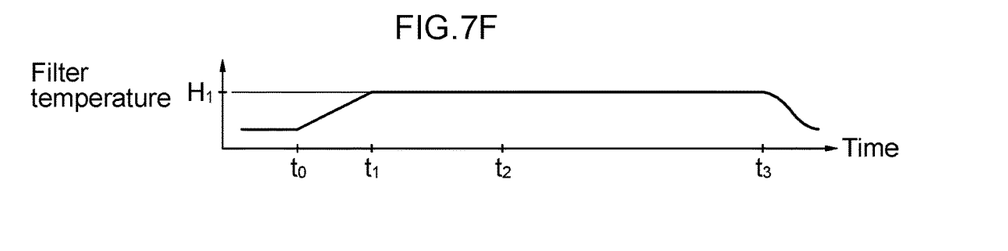

This rapidly raises the filter temperature and consequently the filter temperature reaches the predetermined temperature in a short time. Since the average air-fuel ratio of the stoichiometric heating control is the logical air-fuel ratio $R_0$, NOx is little exhausted from the engine 1 as shown in FIG. 7D and therefore preferable exhaust gas property is maintained. After that, when the filter temperature reaches the predetermined temperature, the control proceeds to step A9. For example, as shown in FIG. 7F, the stoichiometric heating control ends at the time t1 when the filter temperature reaches the predetermined temperature H1.

In Step A9, determination is made as to whether the NOx concentration detected by the NOx sensor 8 is the predetermined concentration or less. Further, in Step A10, determination is made as to whether the stacking amount of PM is the predetermined amount or more. If the conditions of Steps A9 and A10 are both satisfied, the lean incineration control and the advance control are executed (Step A11). For example, as shown by time period between times t1 and t2 in FIGS. 7A and 7B, the air-fuel ratio is maintained to be the predetermined air-fuel ratio $R_1$ and the ignition timing is changed to a second ignition timing $\theta_2$ advanced from the normal ignition timing $\theta_0$.

If either one of the conditions of Steps A9 and A10 is not satisfied, the stoichiometric incineration control and the ignition timing variable control are executed (Step A12). In the example of FIGS. 7D and 7E, the stacking amount of PM comes to be less than the predetermined amount G1 at the time t2, and the lean incineration control is switched to the stoichiometric incineration control. Under this state, as shown by time period between times t2 and t3 in FIGS. 7A and 7B, the air-fuel ratio is controlled so as to largely oscillate about the logical air-fuel ratio $R_0$ and the ignition timing is changed in accordance with the filter temperature. This makes it possible to easily keep the filter temperature at the predetermined temperature, so that the burning reaction of PM can be stabilized. In addition, since the average air-fuel ratio is the logical air-fuel ratio $R_0$, the amount of NOx exhausted from the engine 1 immediately reduces and preferable exhaust gas property can be maintained as shown in FIG. 7D.

After that, determination is made as to whether the condition for finishing regeneration is satisfied (Step A13). In this step, determination is made as to whether at least one of Conditions 7-9 is satisfied and if the condition of Step A13 is satisfied, the regeneration control is finished (Step A14). In the example of FIG. 7F, the regeneration control is finished at the time t3 when the stacking amount of PM comes to be the second predetermined amount G2 or less, and in turn the normal control is resumed. In contrast, if the condition of Step S13 is not satisfied, the procedure proceeds to Step A9, the lean incineration control or the stoichiometric incineration control is continued. Since these controls are each properly used in accordance with the circumstance, the regeneration efficiency of the filter 4 and the exhaust gas property can be both enhanced.

4. Actions and Effects:

(1) In the foregoing embodiment, the regeneration control of the filter 4 uses the lean incineration control and the stoichiometric incineration control in combination with each other. The lean incineration control can increase the oxygen concentration in the exhaust gas to be introduced into the filter 4, so that the efficiency of incinerating the PM can be enhanced. In contrast, the stoichiometric incineration control reserves a certain amount of oxygen concentration to let PM burn and also can suppress the amount of NOx generated in the engine 1. By properly using each of these controls in accordance with the circumstance, the regeneration efficiency of the filter 4 and the exhaust gas property can be both enhanced.

(2) In the foregoing embodiment, the stoichiometric heating control is executed when the regeneration control is started. The stoichiometric heating control can raise the filter temperature to the predetermined temperature (at which the PM is incinerated) in a short time, so that the regeneration efficiency of the filter 4 and the exhaust gas property can be both enhanced. By setting the amplitude of the air-fuel ratio of the stoichiometric heating control to be smaller than that of the stoichiometric incineration control, the burning stability of the engine 1 can be ensured at the start of the regeneration control. From a different viewpoint, by setting the amplitude of the air-fuel ratio of the stoichiometric incineration control to be larger than that of the stoichiometric heating control, the average value of the oxygen concentration in the exhaust path 2 can be increased, so that the regeneration efficiency of the filter 4 can be further enhanced.

(3) In the foregoing embodiment, the stoichiometric heating control is executed until the filter temperature reaches the predetermined temperature, and after that, the lean incineration control or stoichiometric incineration control is started. Since either one of the lean incineration control and the stoichiometric incineration control is executed after the filter temperature reaches the predetermined temperature, the efficiency of incinerating the PM can be enhanced. In contrast, since the stoichiometric heating control is continued until the filter temperature reaches the predetermined temperature, the filter temperature can be raised in a short time. This results in that the lean incineration control or the stoichiometric incineration control can be started in a short time, so that the regeneration efficiency of the filter 4 and the exhaust gas property can be both enhanced.

(4) In the foregoing embodiment, the retardation control is executed during the execution of the stoichiometric heating control. This can accelerate the rising rate of the temperature of the filter 4, so that the filter temperature can be raised in a shorter time. In other words, the preparation time until the lean incineration control or the stoichiometric incineration control is started can be shortened, and the regeneration efficiency of the filter 4 and the exhaust gas property can be both enhanced.

(5) In the foregoing embodiment, the lean incineration control and the stoichiometric control are switched to each other on the basis of the stacking amount of PM and/or the NOx concentration. This can enhance the regeneration efficiency of the filter 4 by using the lean incineration control in such a range that the NOx property is not excessively hindered, for example. Otherwise, the exhaust gas property can be enhanced by using the stoichiometric incineration in such a range that the filtration efficiency of the filter 4 is not excessively hindered. Accordingly, the regeneration efficiency of the filter 4 and the exhaust gas property can be both enhanced.

(6) In switching between the lean incineration control and the stoichiometric incineration control, it is presumed that control may be performed by referring to either one of the stacking amount of PM and the NOx concentration on the basis of the frequency of executing the regeneration control. For example, in a vehicle 20 in which the regeneration control is frequently executed, even if the current regeneration control fails to incinerate a sufficient amount of PM, there may cause no problem if the remaining PM is incinerated in the next regeneration control. In this case, switching between the lean incineration control and the stoichiometric control only on the basis of the NOx concentration without referring to the stacking amount of PM can enhance the exhaust gas property in preference to the regeneration efficiency of the filter 4. In contrast to the above, switching the lean incineration control and the stoichiometric incineration control only on the basis of the stacking amount of PM can preferentially enhance the regeneration efficiency of the filter 4.

(7) In the foregoing embodiment, the normal control is executed before the regeneration control is started. The normal control can enhance the fuel consumption, stabilizing the combustion state of the engine 1. In cases where the oxidizing catalyst (three-way catalyst) 3 is interposed on the exhaust path 2, the purification ability of carbon monoxide (CO) and the purification ability of NOx at the oxidizing catalyst (three-way catalyst) 3 can be ensured, so that the exhaust gas property can be enhanced.

(8) In the foregoing embodiment, the advance control is executed during the execution of the lean incineration control, so that the overheating of the filter temperature can be suppressed. In particular, in cases where the retardation control is executed during the execution of the stoichiometric heating control, the exhaust temperature sharply rises and consequently the filter temperature easily and largely exceeds the predetermined temperature (e.g., 600-650° C.). Under this circumstance, the lean incineration control, which is executed after the stoichiometric heating control, arrests the temperature rise, so that occurrence of overheating can be further surely prohibited.

(9) In the foregoing embodiment, the ignition timing variable control is executed during the execution of the stoichiometric incineration control. In the ignition timing variable control, the ignition timing is set to be more advanced as the filter temperature is higher and to be more retarded as the filter temperature is lower. This setting makes it possible to keep the filter temperature at the predetermined temperature (e.g., 600-650° C.), so that the regeneration efficiency of the filter 4 can be further enhanced.

5. Modification:

The foregoing embodiment is merely example and there is no intention to exclude modifications and application of techniques not explicitly described in the embodiment. Each configuration of the foregoing embodiment can be variously modified without departing from the scope of the embodiment. The respective configurations can be selected, omitted, or appropriately combined as required.

In the foregoing embodiment, description is exemplarily made in relation to the vehicle 20 equipped with the engine 1, but there is no intention to restrict the object of the present embodiment to a vehicle 20. Alternatively, the management target of the controller 10 may be the filter 4 of the engine 1 mounted on a ship or an aircraft. Further alternatively, the filter 4 of the engine 1 incorporated in a generator or an industrial machine can be regarded as the management target of the controller 10.

REFERENCE SIGNS LIST

1 engine (internal combustion engine)
2 exhaust path
3 oxidizing catalyst (three-way catalyst)
4 filter
5 upstream pressure sensor
6 downstream pressure sensor
7 temperature sensor
8 NOx sensor
9 PM sensor
10 controller
11 fuel injection valve
12 ignitor The invention thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. An exhaust controlling apparatus for an internal combustion engine comprising:
   a filter that is disposed on an exhaust path of the internal combustion engine and that captures particulate matter exhausted from the internal combustion engine; and
   a controller that executes regeneration control that incinerates the particulate matter captured on the filter, wherein
   while the controller is executing the regeneration control, the controller executes lean incineration control and stoichiometric incineration control in combination with each other;
   the lean incineration control incinerates the particulate matter, keeping an air-fuel ratio of the internal combustion engine to be leaner than a logical air-fuel ratio; and the stoichiometric incineration control incinerates the particulate matter, oscillating the air-fuel ratio of the internal combustion engine about the logical air-fuel ratio as an average air-fuel ratio at a predetermined first frequency of the oscillation equal to or larger than a reference frequency of the oscillation, wherein before the controller starts the regeneration control, the controller executes normal control that oscillates the air-fuel ratio of the internal combustion engine about the logical air-fuel ratio serving as the average air-fuel ratio at an amplitude smaller than that of the stoichiometric incineration control and at the reference frequency of the oscillation.

2. The exhaust controlling apparatus according to claim 1, wherein when the controller starts the regeneration control, the controller executes stoichiometric heating control that heats the filter, oscillating the air-fuel ratio of the internal combustion engine about the logical air-fuel ratio serving as the average air-fuel ratio at an amplitude smaller than that of the stoichiometric incineration control and larger than that of the normal control, and at a second frequency ($B_2$) of the oscillation equal to or less than the first frequency of the oscillation, wherein after the controller executes the stoichiometric heating control, the controller executes one of the lean incineration control and the stoichiometric incineration control.

3. The exhaust controlling apparatus according to claim 2, wherein the controller executes the stoichiometric heating control until temperature of the filter reaches a predetermined temperature, and executes one of the lean incineration control and the stoichiometric incineration control after the temperature of the filter reaches the predetermined temperature.

4. The exhaust controlling apparatus according to claim 2, wherein while the controller is executing the stoichiometric heating control, the controller executes retardation control that retards an ignition timing of the internal combustion engine as compared with that of the normal control.

5. The exhaust controlling apparatus according to claim 1, wherein the controller switches between the lean incineration control and the stoichiometric incineration control by referring to at least one of a stacking amount of the particulate matter captured on the filter or a concentration of nitrogen oxide exhausted from the internal combustion engine.

6. The exhaust controlling apparatus according to claim 5, wherein the controller refers to one of the stacking amount of the particulate matter and the concentration of nitrogen oxide by referring to a frequency of executing the regeneration control when the controller switches between the lean incineration control and the stoichiometric incineration control.

7. The exhaust controlling apparatus according to claim 1, wherein while the controller is executing the lean incineration control, the controller executes advance control that advances an ignition timing of the internal combustion engine as compared with that of the normal control.

8. The exhaust controlling apparatus according to claim 1, wherein while the controller is executing the stoichiometric incineration control, the controller executes ignition timing variable control that adjusts an ignition timing of the internal combustion engine according to temperature of the filter.

* * * * *